(12) United States Patent
Sawicki et al.

(10) Patent No.: US 8,555,212 B2
(45) Date of Patent: Oct. 8, 2013

(54) MANUFACTURABILITY

(75) Inventors: Joseph D Sawicki, Portland, OR (US);
Laurence W Grodd, Portland, OR (US);
John G Ferguson, Tualatin, OR (US);
Sanjay Dhar, Lake Oswego, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 12/334,369

(22) Filed: Dec. 12, 2008

(65) Prior Publication Data
US 2009/0235209 A1  Sep. 17, 2009

Related U.S. Application Data

(63) Continuation of application No. 10/951,710, filed on Sep. 29, 2004, now abandoned, and a continuation of application No. 10/827,990, filed on Apr. 19, 2004.

(60) Provisional application No. 60/488,363, filed on Jul. 18, 2003.

(51) Int. Cl.
*G06F 17/50* (2006.01)

(52) U.S. Cl.
USPC .............. 716/54; 716/100; 716/102; 716/112

(58) Field of Classification Search
USPC ........... 716/54, 100, 102, 110, 111, 112, 118, 716/119, 122, 132
See application file for complete search history.

(56) References Cited

U.S. PATENT DOCUMENTS

| | | | |
|---|---|---|---|
| 4,918,627 A * | 4/1990 | Garcia et al. | 702/82 |
| 5,475,695 A | 12/1995 | Caywood et al. | |
| 5,539,652 A | 7/1996 | Tegethoff | |
| 5,586,052 A * | 12/1996 | Iannuzzi et al. | 703/1 |
| 5,903,471 A | 5/1999 | Pullela et al. | |
| 6,249,904 B1 * | 6/2001 | Cobb | 716/53 |
| 6,292,582 B1 | 9/2001 | Lin et al. | |
| 6,324,481 B1 | 11/2001 | Atchison et al. | |
| 6,393,602 B1 | 5/2002 | Atchison et al. | |
| 6,584,609 B1 * | 6/2003 | Pierrat et al. | 716/52 |
| 6,710,845 B2 | 3/2004 | Wu et al. | |
| 6,757,645 B2 | 6/2004 | Chang et al. | |
| 6,832,360 B2 * | 12/2004 | Li | 716/112 |
| 6,834,117 B1 | 12/2004 | Rao et al. | |
| 6,968,253 B2 | 11/2005 | Mack et al. | |
| 6,973,633 B2 | 12/2005 | Lippincott et al. | |
| 6,999,611 B1 | 2/2006 | Lopez et al. | |
| 7,017,141 B2 | 3/2006 | Anderson et al. | |
| 7,093,229 B2 | 8/2006 | Pang et al. | |
| 7,142,941 B2 | 11/2006 | Mack et al. | |
| 7,181,707 B2 | 2/2007 | Kotani et al. | |

(Continued)

OTHER PUBLICATIONS

"Calibre DRC and LVS Datasheet," Mentor Graphics, 2002.

(Continued)

*Primary Examiner* — Sun Lin
(74) *Attorney, Agent, or Firm* — Mentor Graphics Corporation (57) ABSTRACT

Techniques are disclosed for modifying an existing microdevice design to improve its manufacturability. With these techniques, a designer receives manufacturing criteria associated with data in a design. The associated design data then is identified and provided to the microdevice designer, who may choose to modify the design based upon the manufacturing criteria. In this manner, the designer can directly incorporate manufacturing criteria from the foundry in the original design of the microdevice.

20 Claims, 6 Drawing Sheets

(56) References Cited

U.S. PATENT DOCUMENTS

| | | | |
|---|---|---|---|
| 2003/0003385 A1 | 1/2003 | Martin | |
| 2003/0014146 A1 | 1/2003 | Fujii et al. | |
| 2003/0086081 A1 | 5/2003 | Lehman | |
| 2003/0088847 A1 | 5/2003 | Chang et al. | |
| 2003/0126581 A1 | 7/2003 | Pang et al. | |
| 2003/0148198 A1 | 8/2003 | Lakkapragada et al. | |
| 2003/0162105 A1 | 8/2003 | Nojima et al. | |
| 2004/0015808 A1 | 1/2004 | Pang et al. | |
| 2004/0052411 A1 | 3/2004 | Qian et al. | |
| 2004/0091142 A1 | 5/2004 | Peterson et al. | |
| 2004/0139418 A1 | 7/2004 | Shi et al. | |
| 2004/0199891 A1* | 10/2004 | Bentley et al. | 716/11 |
| 2005/0004774 A1 | 1/2005 | Volk et al. | |
| 2005/0120327 A1 | 6/2005 | Ye et al. | |
| 2005/0216877 A1 | 9/2005 | Pack et al. | |
| 2005/0240895 A1 | 10/2005 | Smith et al. | |
| 2006/0236298 A1 | 10/2006 | Cobb et al. | |
| 2007/0022402 A1 | 1/2007 | Ye et al. | |
| 2008/0148201 A1 | 6/2008 | Lanzerotti et al. | |

OTHER PUBLICATIONS

"Voltagestorm SoC Power Grid Verification Datasheet," Cadence Design Systems, 2002.

'Towards Next-Generation Design-For-Manufacturability (DFM) Frameworks for Electronics Product Realization' by Bajaj et al., IEEE/CPMT/ Semi Intl., Jul. 16, 2003.

"Turning Up the Yield," by John Ferguson, Electronic Systems and Software IEE UK, vol. 1, No. 3, Jun. 2003.

"Design for Manufacturability in Submicron Domain," by Maly et al., Computer-Aided Design, Nov. 1996.

"Design for Manufacturability And Yield," by Andrze Strojwas, Proc. Des. Autom. Conf., 1989.

"CAMtastic! 2000 Designer's Edition User's Guide," Accel Technologies, 2000.

"Improving PCBA Solderability By Design," by Dale Lee , SMT, Pennell Corp., Oct. 2001.

"PCA's: Ultra-Thin Is In," by Dale Lee, SMTA National Symposium, Emerging Technologies, 1997.

"Impact Of Multiple-Detect Test Patterns On Product Quality," by Brady Benware et al., ITC International Test Converence, IEEE 2003.

"The Design for Manufacturing-EDA Connection," by Ann Steffora, Jun. 11, 2001.

*Docket List for Dr. Ajay Singhal* v. *Mentor Graphics Corp.*, Case No. 3:07-cv-01587-JL, U.S. District, California Northern District, (Dec. 19, 2011).

* cited by examiner

MANUFACTURABILITY

This application claims priority to and is a continuation of U.S. patent application Ser. No. 10/951,710, filed Sep. 29, 2004, entitled "Design For Manufacturability," naming Joseph Sawicki et al. as inventors, which application further claims priority to and is a continuation of International PCT Patent Application No. PCT/US2004/22831, filed Jul. 16, 2004, entitled "Design For Manufacturability," naming Joseph Sawicki et al. as inventors, which applications are incorporated entirely herein by reference. This application also claims priority to and is a continuation-in-part of U.S. patent application Ser. No. 10/827,990, filed Apr. 19, 2004, entitled "Design For Manufacturability," naming Joseph Sawicki et al. as inventors, which application further claims priority to U.S. Provisional Application No. 60/488,363, filed Jul. 18, 2003, entitled "Techniques For Maximizing Yield In Nanometer Designs," naming John Ferguson et al. as inventors, which applications are incorporated entirely herein by reference.

FIELD OF THE INVENTION

The present invention relates to various techniques and tools to assist in the design of microdevices. Various aspects of the present invention are particularly applicable to the design of microdevices so as to improve the subsequent manufacturability of those microdevices.

BACKGROUND OF THE INVENTION

Microcircuit devices are used in a variety of products, from automobiles to microwaves to personal computers. Designing and fabricating microcircuit devices involves many steps; which has become known as a 'design flow,' the particular steps of which are highly dependent on the type of microcircuit, the complexity, the design team, and the microcircuit fabricator or foundry. Several steps are common to all design flows: first a design specification is modeled logically, typically in a hardware design language (HDL). Software and hardware "tools" verify the design at various stages of the design flow by running software simulators and/or hardware emulators, and errors are corrected.

After the logical design is satisfactory, it is converted into design data by synthesis software. The design data, often called a "netlist", represents the specific electronic devices, such as transistors, resistors, and capacitors, and their interconnections that will achieve the desired logical result. Preliminary estimates of timing may also be made at this stage using an assumed characteristic speed for each device. This "netlist" can also be viewed as corresponding to the level of representation displayed in typical circuit diagrams.

Once the relationships between circuit elements have been established, the design is again transformed, this time into the specific geometric elements that define the shapes that will occur to form the individual elements. Custom layout editors, such as Mentor Graphics' IC Station or Cadence's Virtuoso are commonly used for this task. Automated place and route tools can also be used to define the physical layouts, especially of wires that will be used to interconnect logical elements.

The physical design data represents the patterns that will be written onto the masks used to fabricate the desired microcircuit device, typically by photolithographic processes. Each layer of the integrated circuit has a corresponding layer representation in the physical database, and the geometric shapes described by the data in that layer representation define the relative locations of the circuit elements. For example, the shapes for the layer representation of an implant layer define the regions where doping will occur; the line shapes in the layer representation of an interconnect layer define the locations of the metal wires to connect elements, etc. It is very important that the physical design information accurately embody the design specification and logical design for proper performance. Further, because the physical design data, also called a "layout", is used to create the photomasks or reticles used in manufacturing, the data must conform to the requirements of the manufacturing facility, or "fab", that will manufacture the final devices. Each fab specifies its own physical design parameters for compliance with their process, equipment, and techniques.

As the importance of microcircuit devices grow, designers and manufacturers continue to improve these devices. Each year, for example, microcircuit device manufacturers develop new techniques that allow microcircuit devices, such as programmable microprocessors, to be more complex and smaller in size. Microprocessors are now manufactured with over 50 million transistors, each with dimensions of only 90 nm. As the devices continue to become smaller, more of them can become integrated into a single chip. Moreover, many manufacturers are now employing these techniques to manufacture other types of microdevices, such as optical devices, photonic structures, mechanical machines or other micro-electromechanical systems (MEMS) and static storage devices. These other microdevices show promise to be as important as microcircuit devices are currently.

Figure 1A:
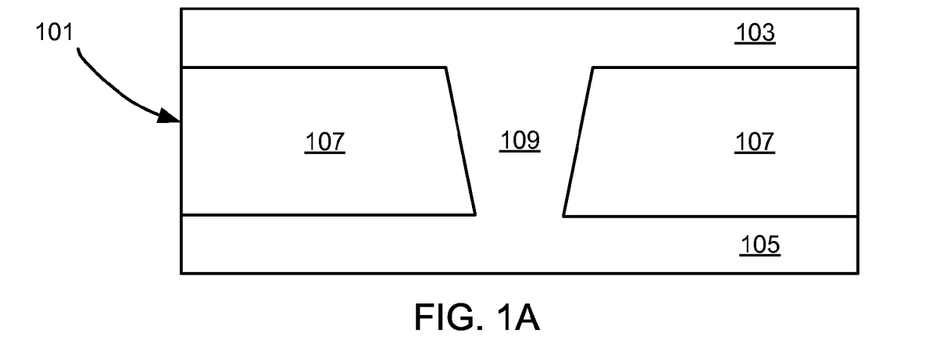
FIGS. 1 to 3 illustrate a device having a via between two conductive layers.
Figure 1B:
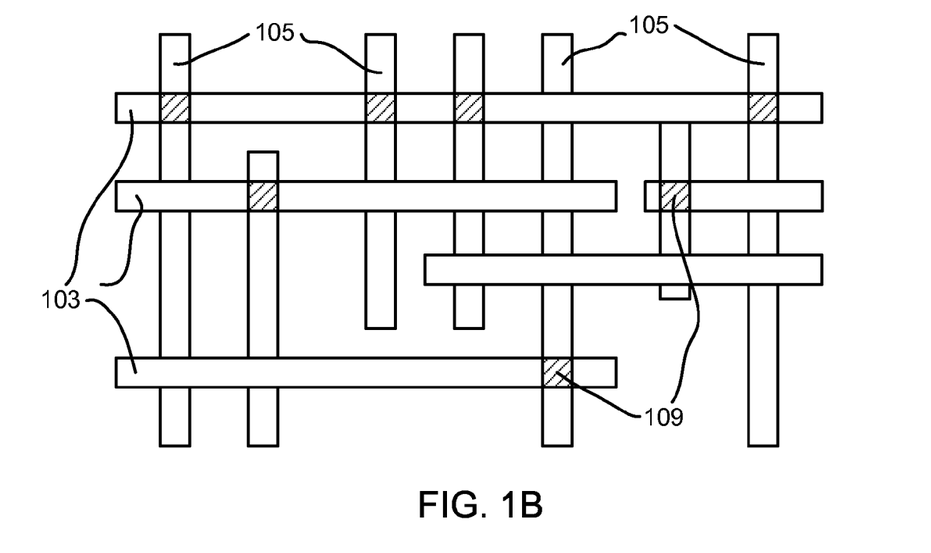

As microdevices become more complex, they also become more difficult to design. A conventional microcircuit device, for example, may have many millions of connections, and each connection may cause the microcircuit to operate incorrectly or even fail if the connection is not properly designated. Not only must the connections be properly designated, but the structure of the connections themselves must be properly manufactured. For example, a microcircuit device may have several different conductive or "wiring" layers connected by plugs of conductive material referred to as a "contacts" or "vias." Referring now to FIGS. 1A and 1B, these figures illustrate an idealized design for a portion of a microcircuit device 101. According to this idealized design, the microcircuit device 101 includes wires formed in a first conductive layer of material 103 and a second conductive layer of material 105 separated by a nonconductive layer of material 107. The conductive layers 103 and 105 then are connected by a conductive plug of metal or via 109 through the nonconductive layer 107. It should be appreciated that these figures are for illustrative purposes only, and thus may omit some features, such as barrier layers of material or detailed topological features, that might occur in an actual structure, for simplicity and ease of understanding.

Figure 2:
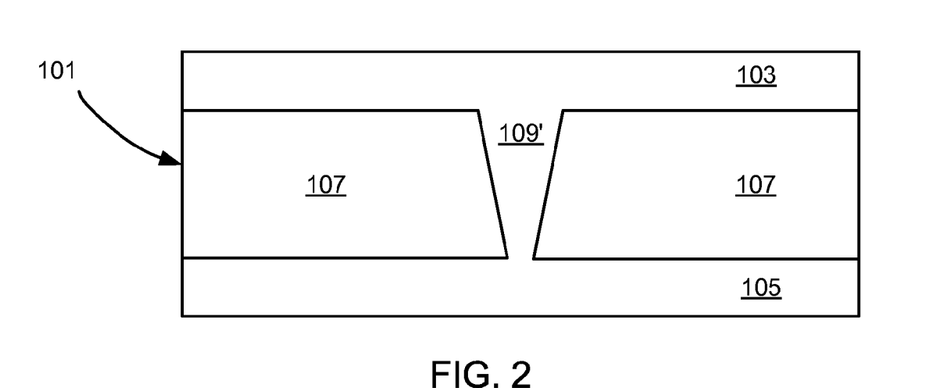
Figure 3:
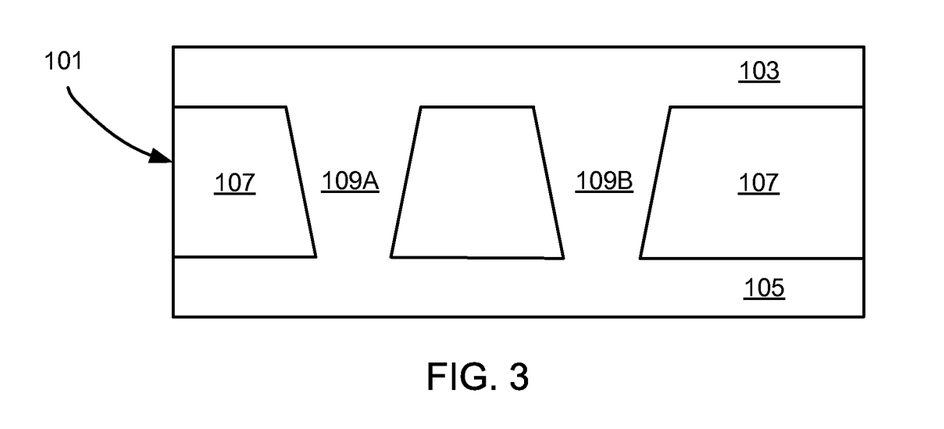
Figure 3B:
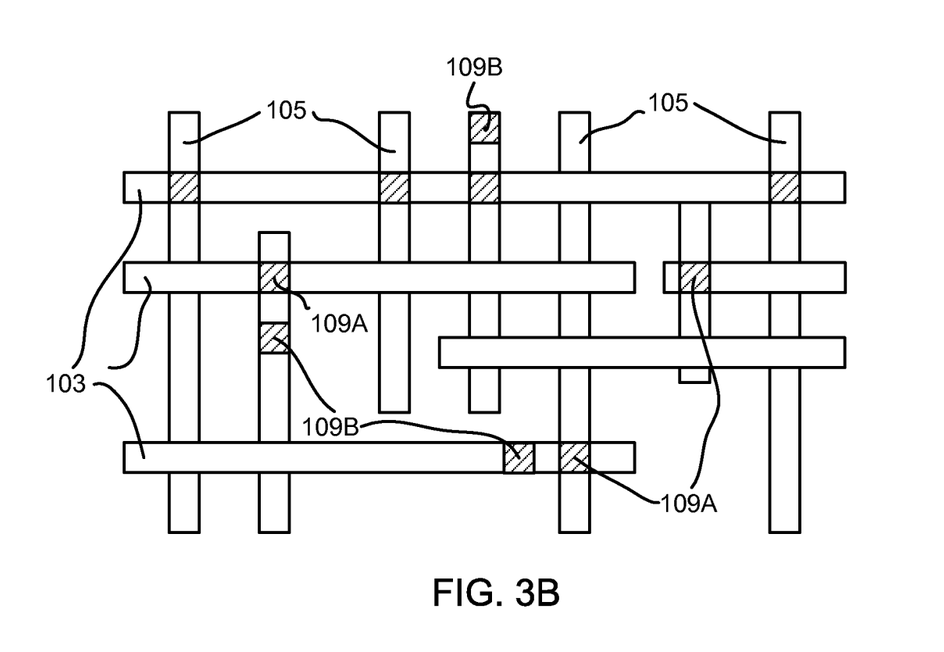

Although the via 109 of the idealized design shown in FIG. 1 will provide a suitable connection between the conductive layers 103 and 105, variation in local processing conditions during the manufacture of the device 101 may cause a particular via to be too small to provide a suitable electrical connection. For example, as shown in FIG. 2, the manufactured via 109' is too small to carry a minimum required current between conductive layers 103 and 105. To address this problem, a manufacturer may modify the design of the microcircuit to include a second or "redundant" via as a backup in case the first via is not properly formed during the manufacturing process. More particularly, instead of a single via 109 forming the only transition between two conductive layers (i.e., a "single-transition" via), the device 101 may include two vias 109A and 109B, as shown in FIG. 3. Thus, if a single via is not manufactured correctly, its redundant via may still form the desired connection. A conventional microcircuit may have 15 million vias, of which 10 million may be originally designed as single-transition vias. Identifying and doubling even 2 million of those vias would therefore provide a significant improvement in the reliability of the microcircuit.

Adding redundant vias reduces the occurrence of via failures, but not all vias can be duplicated. For example, the layout of a circuit may only allow room for a single via between two layers of conductive material. Also, the additional metal required to form a redundant via may change the capacitance of the surrounding circuit. If the timing of that circuit is critical, adding a redundant via may cause more problems than it would solve. Identifying an insufficiently redundant via is purely a geometric operation, but determining whether to "fix" a via by adding a redundant via requires source information relating to the entire microcircuit design. The device manufacturer thus cannot simply double each via, but must instead determine which vias can be doubled without impacting the operation of the microcircuit.

Vias have been described above as one example of a microdevice structure that can be designed for greater reliability, but there are numerous aspects of a microdevice design that can be modified to improve the reliability, performance or cost of the device, or a combination of two or more of these features. For example, "critical area analysis" can often be applied to predict the susceptibility of a grid of wires to be shorted by a defect, and designs can be altered to increase the spacings between wires in these critical areas, reducing the susceptibility to failure. Similarly, like vias, "contacts" that connect a polysilicon structure (e.g., a transistor gate) with a metal layer may also be designed for greater reliability.

Another example can be found in the preparation of the layout data for mask or reticle fabrication. Masks and reticles are typically made using large tools that expose a blank reticle using electron or laser beams. The pattern of exposure is used to write the desired circuit patterns on the mask, which in turn is used to print the actual device structures on the wafers. Most mask writing tools are able to only write certain kinds of polygons, such as rectangles or trapezoids, and only if they are smaller that a machine limited dimension. Larger features, or features that are not basic rectangles or trapezoids (which would be a majority of microcircuit features) must be "fractured" into these smaller, more basic polygons for writing. Often, the length of time it takes to write a mask is in direct proportion to the number of polygons into which a layout has been fractured. Clearly, a more efficient fracturing into a smaller number of polygons can improve the throughput of the mask writing tool considerably. This is especially true for the complex feature shapes created when a layout has been modified by RET software, to compensate for the distortions and optical effects that will occur during photolithographic processing. The design of a microdevice therefore can be modified for improved manufacturability at a number of different levels, from the overall arrangement of components to the specific mask shapes used to form those components.

While microdevice designs can be modified for improved manufacturability, these modifications are not typically available to the microdevice designer during the design process. Instead, these modifications are typically provided by the fab that will manufacture the microdevice after the design has been created. The modifications provided by a fab may depend upon, for example, the manufacturing equipment employed by the fab, the fab's technical expertise and its previous manufacturing experience. Some characteristics of a microdevice design will facilitate the fab to implement these modifications, but other design characteristics may hinder the implementation of these modifications.

It would be desirable, therefore, to allow a microdevice designer to incorporate modifications to improve the manufacturability into the design flow for the microdevice design. Further, it would be desirable to provide the designer with some guidance as to how the original design should be modified to improve its manufacturability at the foundry. That is, it would be desirable to provide a designer with guidance on how to design a microdevice so that modifications to improve the microdevice's manufacturability can be more optimally applied by the fab at the time of the microdevice's manufacture.

BRIEF SUMMARY OF THE INVENTION

Advantageously, various examples of the invention provide techniques for modifying an existing microdevice design to improve its manufacturability. The manufacturing improvements may be directed toward an improved yield in manufacturing the microdevices, better operating performance, lower costs for manufacturing the microdevice, or a combination of two or more of these features. According to different examples of the invention, a designer receives manufacturing criteria or process information associated with data in a design, which are stored in a statistical database. The design data associated with particular aspects of the manufacturing criteria are then identified and provided to the microdevice designer, who may choose to modify the design based upon the manufacturing criteria. In this manner, the designer can directly incorporate manufacturing criteria from the foundry in the original design of the microdevice.

DETAILED DESCRIPTION OF THE INVENTION

Overview

Various embodiments of the invention relate to techniques for modifying an existing microdevice design to improve the manufacturability of the microdevice. The improvements to manufacturability may result in an improved yield for the microdevices (that is, fewer failures per manufactured microdevice). The improvements may also result in better operating performance of the microdevice, lower costs for manufacturing the microdevice, or a combination of two or more of these features.

According to different embodiments of the invention, manufacturing criteria or process information associated with data in a design are provided to a database designed to receive such data. The associated design data then is identified and provided to the microdevice designer, who may choose to modify the design based upon the manufacturing criteria. Hints suggesting possible corrections, based on other criteria in a statistical database or historical use of the database, may also be provided to the designer. In some cases, automatic correction of the associated design data based upon the manufacturing criteria may be carried out, and the tentative result provided to the designer for approval. In other cases, based on the correction history, the changes to the design data may be completed without any approval from the designer. In this manner, manufacturing criteria or other process information from the fab can be directly incorporated into the original design of the microdevice. Various examples of the invention will be discussed in more detail below.

Design for Manufacturability Tool

Figure 4:
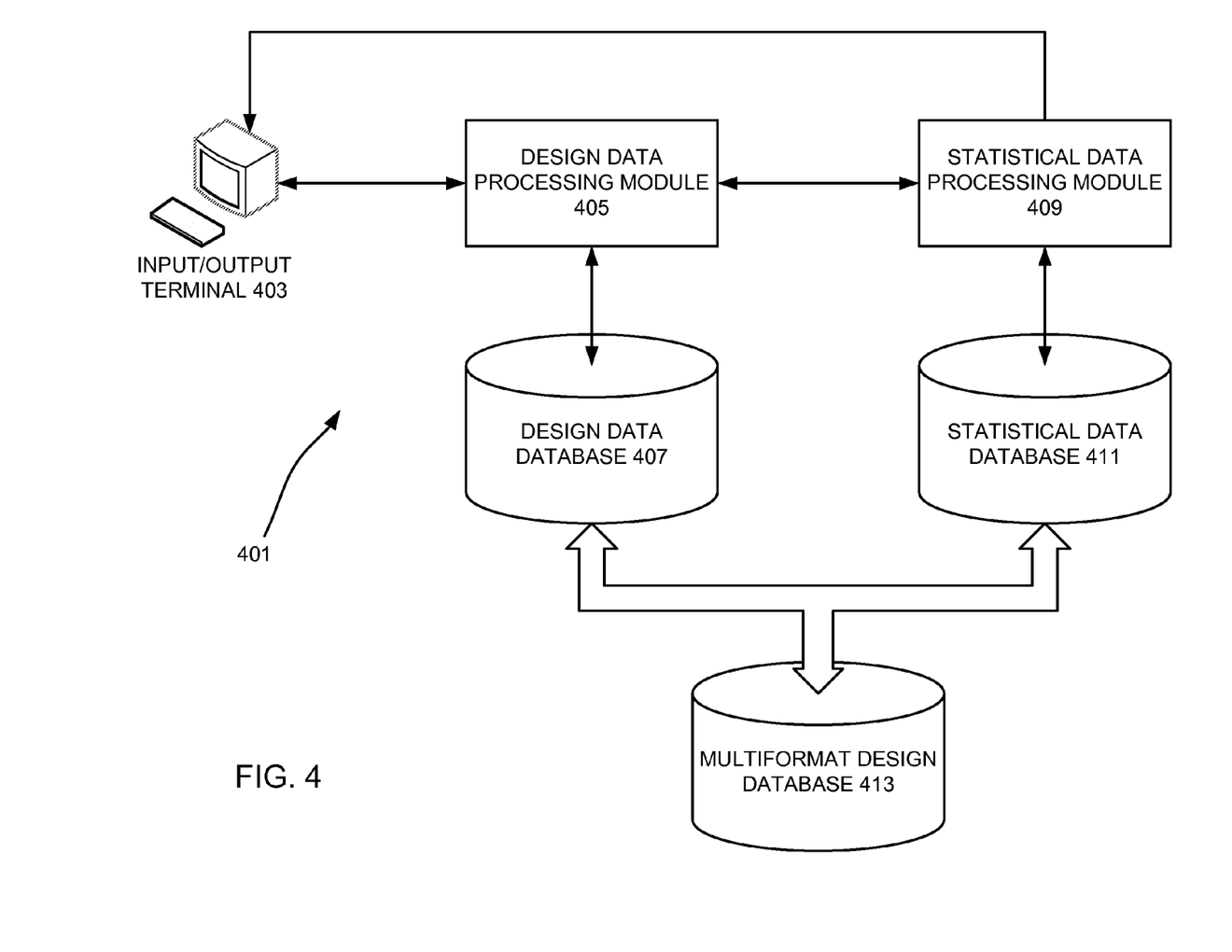
FIG. 4 illustrates a tool to assist in the design of a microdevice for improved manufacturability.

FIG. 4 illustrates one example of a design for manufacturing (DFM) tool 401 according to various embodiments of the invention. As seen in this figure, an input/output terminal 403 communicates with a design data processing module 405, and a design data database 407. As will be discussed in more detail below, the input/output terminal 403 is a user interface to view and manipulate those portions of a design associated with manufacturing criteria. Further, the input/output terminal 403 may provide a user interface that allows a user to specify which portions of a design will be modified based upon its associated manufacturing criteria.

The design data processing module 405 is a processing tool that can be used to manipulate design data for a microdevice. More particularly, the design data processing module 405 may be a programmable computer executing instructions for manipulating microdevice design data. According to various embodiments of the invention, for example, the design data processing module 405 may be implemented as part of a programmable computer executing the CALIBRE® verification and manufacturability software tools available from Mentor Graphics® Corporation of Wilsonville, Oreg. Accordingly, various embodiments of the invention may be implemented by software instructions stored on a medium for execution by a programmable computer. Similarly, various embodiments of the invention may be implemented by the execution of software instructions with a programmable computer.

As will also be discussed in more detail below, the design data processing module 405 identifies design data in a microdevice design that is associated with provided manufacturing criteria or process information. The design data processing module 405 will then provide the identified design data to a user of the input/output terminal 403 for consideration. Based upon input from the user, the design data processing module 405 will also modify the design data using the manufacturing criteria, to improve the manufacturability of the design. The design data database 407 then stores the information employed by the design data processing module 405, including, for example, the design for the microdevice, the manufacturing criteria, and instructions provided by a user through the input/output terminal 403.

The design for manufacturability tool 401 may also include a statistical data processing module 409 and a statistical data database 411. As will be apparent from the following discussion, the statistical data processing module 409 organizes the design data associated with manufacturing criteria into statistically relevant information. For example, as will be discussed in more detail below, the statistical data processing module 409 may create a map showing areas of a design that have a high density of structures (such as vias) associated with manufacturing criteria. As will also be discussed in more detail below, if the design is hierarchically organized, the statistical data processing module 409 may provide statistical information relative to different hierarchical levels of the design. Thus, if the design is hierarchically organized into cells, the statistical data processing module 409 may individually or collectively provide statistical information for design data within a selected cell, within a selected group of cells, or for the entire design. The statistical data database 411 then stores the information used by the statistical data database 411 to organize the design data into statistical information.

The multiformat design database 413 provides design information to the design data database 407 and the statistical data database 411 in a variety of formats used to design different aspects of microdevices. For example, the multiformat design database 413 may include design information for a microcircuit in the form of a "netlist", which abstractly describes electrical connections between components of the microcircuit. The multiformat design database 413 may, for example, store and translate design information into and from any desired format, such as GDSII, OASIS, OAC, Genesis, Apollo, GL1, SPICE, Verilog, VHDL, CDL, and Milkyway, among others.

The multiformat design database 413 also may include design information for a microcircuit in the form of a "fracture format", which geometrically describes the layout of a layer of a microdevice after it has been prepared for use in a mask writing tool. The multiformat design database 413 may, for example, store and translate this type of design information into and from formats that describe polygonal structures used to form components of the microdevice. The multiformat design database 413 may also store and translate this type of design information into and from formats that describe the features on masks used to form the polygonal structures during a photolithographic process.

Operation of the Tool to Modify Vias in a Design

Figure 5A:
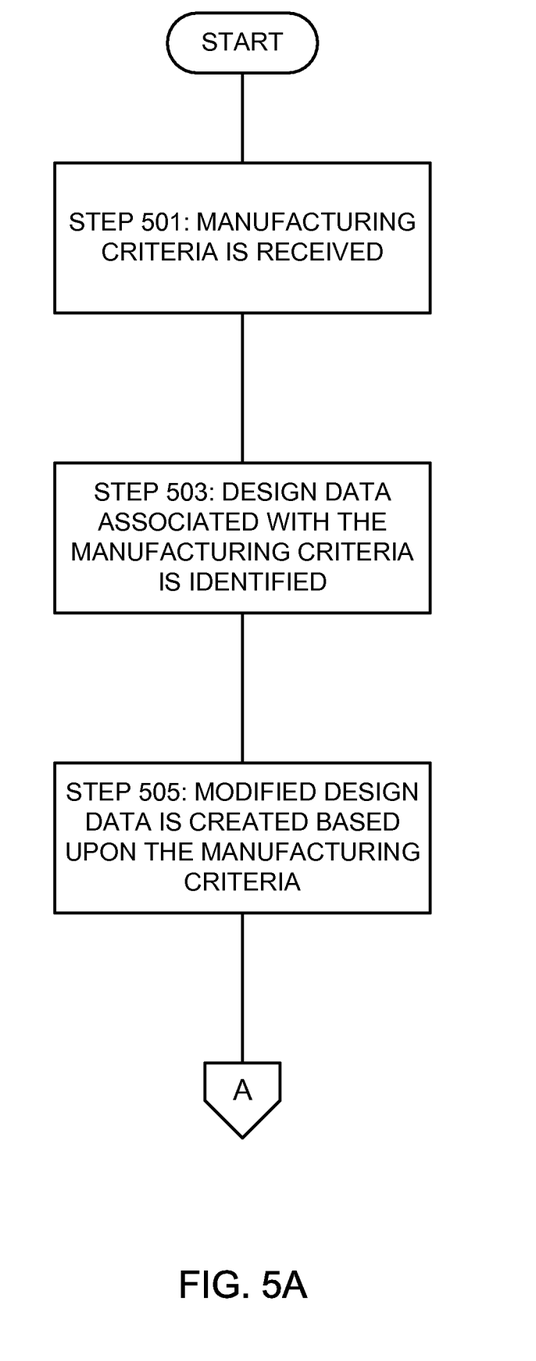
FIGS. 5A and 5B illustrate a flowchart describing a process for improving a microdevice design for manufacturability.
Figure 5B:
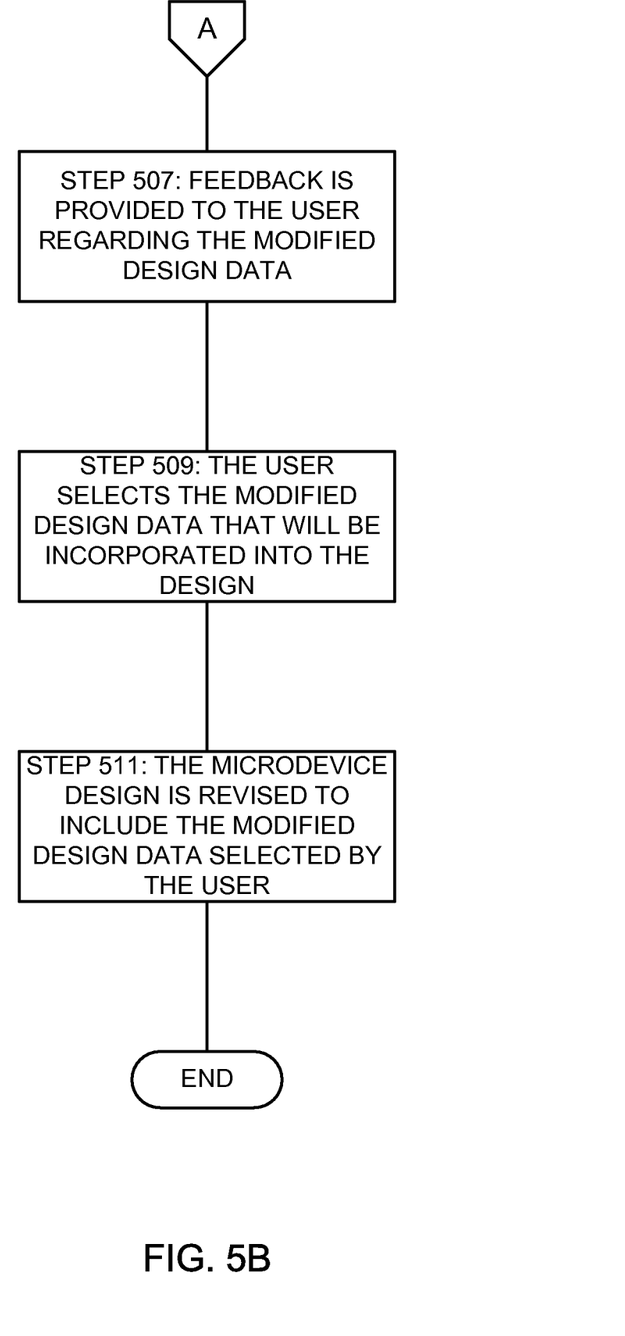

FIGS. 5A and 5B illustrate a flowchart showing one method of operation for a design for manufacturability tool according to various embodiments of the invention, such as the design for manufacturability tool 401 shown in FIG. 4. This method will be described with particular application to the modification of vias in a microcircuit design to improve yield, but it should be appreciated that this method may be applicable to any type of desired modification to a microdevice design. First, in step 501, manufacturing criteria is received through, for example, the multiformat design database 413 into the design data database 407. The manufacturing criteria may be any information relevant to the manufacturing of the microdevice. Thus, for the creation of redundant vias in a microcircuit, the manufacturing criteria may be the minimum amount of external space surrounding a via that is needed to safely create a redundant via without interfering with another component (e.g., a wiring line, a transistor gate, etc.) of the microcircuit. The manufacturing criteria may also include the minimum offset of the redundant via from the original via, and the minimum amount of required external space surrounding a conductive layer that will be connected by a redundant via.

With various embodiments of the invention, the manufacturing criteria will be provided by a foundry that will manufacture the microdevice. The fab will typically have more expertise on the capabilities and limitations of the equipment that they will employ to manufacture the microdevice, The fab thus will be able to provide useful guidance to the microdevice designer on how the design can be improved for manufacturability (such as the minimum available spacing from other components required to safely add a redundant via). In the past, this useful information was available to the designer, typically in the form of written reports and summaries, but no software tool existed which allowed linking the databases containing the manufacturing criteria with the editors for modifying a design. In other words, the designer had no practical way to use the information to analyze or modify a design. According to various embodiments of the invention, however, the manufacturing experience and knowledge of the fab can be directly incorporated into a microdevice design during its creation. With still other embodiments of the invention, the manufacturing criteria may be alternately or additionally provided by the designer of the microdevice. Thus, the designer may, for example, specify the minimum available spacing from other components required to safely add a redundant via.

Once the manufacturing criteria are received, the design data processing module 405 identifies design data associated with the manufacturing criteria in step 503. Thus, with the illustrated example, the design data processing module 405 identifies all pairs of conductive layers or "interconnects" in the existing design that are connected by a single via. The design data processing module 405 will then examine the area surrounding each via structure (with each via structure including both the via and the interconnects connected by the via) to determine if the via structure can support a redundant via. More particularly, for each via structure in the design, the design data processing module 405 will examine the area of the first interconnect offset from one side of the via by the offset values specified in the manufacturing criteria. The design data processing module 405 will then determine if this area of the first interconnect will allow a via to be formed that satisfies the external minimum spacing set forth in the manufacturing criteria. Similarly, the design data processing module 405 will determine if the corresponding areas of the via layer (i.e., the layer through which the via will be formed) and the second interconnect will both allow a via to be formed that satisfies the external minimum spacing value or values set forth in the manufacturing criteria.

Figure 6:
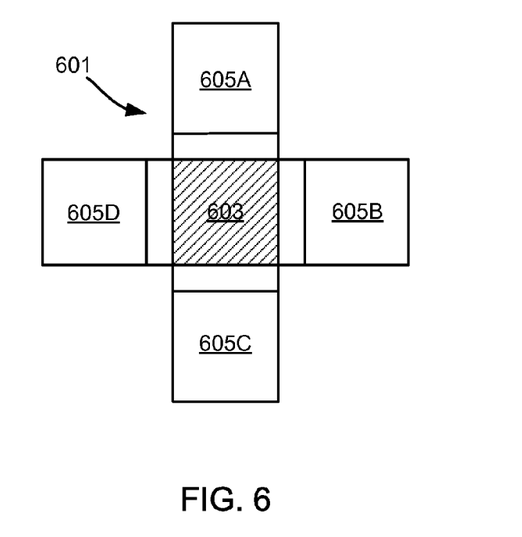
FIG. 6 illustrates areas around a via for locating a redundant via.

FIG. 6 illustrates a region 601 of a first interconnect in a via structure that includes the via 603. In order to determine if this region of the first interconnect will support a redundant via, the design data processing module 405 thus may examine the area 605A to one side of the via 603 defined by the offset values specified in the manufacturing criteria area 605A, to determine if a via can be formed in this area 603A that will comply with the external minimum spacing value or values set forth in the manufacturing criteria. The design data processing module 405 will also determine if the corresponding area of the via layer and the corresponding area of the second interconnect will both allow a via to be formed that satisfies the external minimum spacing value or values set forth in the manufacturing criteria.

If the analysis of this area determines that the via structure will not meet the minimum spacing requirements of the manufacturing criteria, then this analysis is repeated for each side of the via structure, until the design data processing module 405 identifies an area to one side of the via that will comply with the minimum spacing requirements set forth in the manufacturing criteria, or until it determines that no side of the original via will support a redundant via. Thus, the design data processing module 405 may examine the areas 605B-605D in series to determine if a via can be formed in any of these areas. It should be note that, while the areas 605A-605D are shown as horizontally and vertically aligned in FIG. 6, it should be appreciated that various embodiments of the invention may determine if any desired areas, such as, for example, the location between areas 605A and 605B, will support a redundant via.

If the statistical data processing module 409 can identify an area adjacent to the original via structure that will support a redundant via complying with the minimum spacing requirements set forth in the manufacturing criteria for each layer of the via structure, then the design data processing module 405 will create modified design data for manufacturing the redundant via using the minimum spacing requirements set forth in the manufacturing criteria. That is, in step 505, the design data processing module 405 will create modified design data corresponding to the identified design data based upon the manufacturing criteria. This modified design data may include, for example, data specifying the location and geometry of the redundant, the location and geometry of an extension of the conductive layer 103 or 105 needed to reach the redundant via, or any other data necessary to form the redundant via according to a desired manufacturing process.

Next, the statistical data processing module 409 obtains the modified design data and the original design data. In step 507, the statistical data processing module 409 provides the input/output terminal 403 with feedback to the user of the tool 401 regarding the modified design data. Thus, with the illustrated embodiment, the statistical data processing module 409 provides feedback to the user that, e.g., identifies the via structures that can be modified to include redundant vias. The input/output terminal 403 may be any type of device capable of providing a user with a user interface for interacting with the design for manufacture tool 401. For example, the input/output terminal 403 may be a programmable computer connected to the design data processing module 405 and the statistical data processing module 409 through a private network or a public network, such as the Internet. Alternately, the input/output terminal 403 may include one or more input devices, such as a display, and one more output devices, such as a keyboard, mouse or other pointing device, directly connected to the design data processing module 405 or the statistical data processing module 409.

It should be appreciated that a variety of different types of feedback can be provided to the user regarding the modified design data. For example, the statistical data processing module 409 may create a "temperature" map, showing the regions of the microdevice for which the modified data occurs most frequently. Thus, the map might show regions where 0-10% of the original via structures can be modified to include a redundant via with one color. The map might then show regions where 11-20% of the original via structures can be modified to include a redundant via with another color, and so forth. Alternately, the statistical data processing module 409 may create a map showing each location for which modified design data has been created.

If the design is organized into a hierarchical arrangement, then the statistical data processing module 409 may create feedback for one or more specific levels of the hierarchy. For example, the original design may be organized into "cells" corresponding to different portions of the design. One cell of design data might then correspond to a discrete component, such as a memory circuit, that occurs several hundred times on the microdevice, while a "higher" cell might then represent a register incorporating several of the memory circuits. Rather than providing feedback corresponding to the entire design, the statistical data processing module 409 may thus instead provide feedback based upon the cell of design data representing the memory circuit. For example, the statistical data processing module 409 may create a temperature map of just the memory circuit showing the regions of the microdevice for which the modified data occurs most frequently. Alternately or additionally, the statistical data processing module 409 may create a map of the register showing each location in the memory circuit for which modified design data has been created, or a map of the entire microcircuit showing each location in the memory circuit for which modified design data has been created.

Alternately or additionally, the statistical data processing module 409 may instead provide feedback based upon geographical regions of the microcircuit represented by the design data. For example, the statistical data processing module 409 may partition the area of the microdevice into different regions. Those regions with a high number or percentage of design modifications may be shown in one color, while those regions with a lower number or percentage of design modifications may be shown in another color. This feature allows a designer to focus attention on those portions of a design for which the design modifications will be the most significant.

It should also be noted that any type of desired feedback may be provided by the statistical data processing module 409. The design data database 407 may, for example, create histograms rather than maps for the entire microdevice or particular regions, components, or cells of the microdevice. Still further, the design data processing module 405 may provide pie charts, lists, or any other type of information desirable or useful to inform the user of the available modifications to the design data that was determined by the design data processing module 405. Still further, various embodiments of the invention may allow a user to select how the feedback information will be displayed. For example, some embodiments of the invention may allow the user to select different ranges or values used to display the feedback information. Thus, with the above example, some embodiments of the invention may allow a user to create a map showing regions where 0-15% or 0-20% of the original via structures can be modified to include a redundant via with a single color, rather than displaying regions where 0-10% of the original via structures can be modified with one color and displaying regions where 11-20% of the original via structures can be modified with a different color. Alternately or additionally, various embodiments of the invention may allow a user to specify customized regions, component groups or cell groups for which feedback information will be displayed.

With various embodiments of the invention, the statistical data processing module 409 or the design data processing module 405 may additionally provide the user with guidance information useful in determining whether modified design data will be incorporated into the design. For example, the feedback information may include expected yield data describing the increase in yield that may be expected for the modified design data. Alternately or additionally, the feedback may include cost data describing the increase (or decrease) in manufacturing costs that will result from incorporating the modified design data into the microdevice design. Still further, the feedback may include performance information describing any increase or decrease in the performance of the microdevice that will result from incorporating the modified design data. An example of this would be timing data, showing the impact on the time it will take for certain logical operations to complete using the modified design data.

It should be noted that the feedback may also include any combination of guidance information. For example, the feedback to the user may include cost benefit analysis information describing both the cost change and the resulting yield changes obtained from implementing the modified design data. Also, the feedback may encompass all of the modified design data, be specific to particular categories of modified design data, or both. Thus, if the modified design data relates to both redundant vias and, e.g., widened connection lines, then the feedback information may describe the increase in yield for incorporating the modified design data relating to the redundant vias, the increase in yield for incorporating the modified design data relating to the widened connection lines, the increase in yield for incorporating both sets of modified design data, or any combination of the three categories of yield information.

In step 509, the user selects which portions of the modified design data will be incorporated into the design. It should be appreciated that the user may choose to incorporate all of the modified design data, or only a portion of the modified design data. For example, a user may employ the tool 401 to identify both via structures that can be modified to include redundant vias and connection lines that can be widened. Upon considering the modified design data, the user may decide that the potential design changes to the connection lines are impractical, unfeasible, or unnecessary. In this situation, the user can then select to incorporate only the modified design data relating to redundant vias into the circuit design, and discard the modified design data relating to widened connection lines.

Various embodiments of the invention may alternately or additionally allow a user to incorporate modified design data based upon particular hierarchical levels of the design. For example, a user may choose to incorporate modified design data for one or more cells in the design hierarchy, and discard the modified design data for other cells at the same hierarchical level. Similarly, various embodiments of the invention may alternately or additionally allow a user to incorporate modified design data based upon particular components of the microdevice. For example, a user may choose to incorporate modified design data for a type of memory circuit used in the microdevice, but discard the modified design data for a more sensitive radio frequency modulation component.

Once the user has selected the modified design data to be incorporated into the design, in step 511, the design data processing module 405 revises the microdevice design to include the modified design data selected by the user. In this manner, the design improvements based upon the manufacturing criteria can be incorporated directly into the design. Further, the design improvements can be incorporated into the design before the design is provided to the foundry.

It should be noted that, with various embodiments of the invention, one or more of the steps described above may be reordered or omitted entirely. For example, with some embodiments of the invention, modifications to design data may automatically be incorporated into a design without requiring a user's approval. With still other embodiments of the invention, the user may only receive feedback regarding modified design data, without being able to directly incorporate the modified design data into the original design. The user may, for example, use an alternate tool to incorporate the modified design data. Still further, with various embodiments of the invention, the designer may be required to select which modified design data will not be incorporated into the design, with the unselected modified design data then being automatically incorporated into the design.

Still further, it should be appreciated that multiple types of manufacturing criteria can be simultaneously employed to create modified design data. In above-described examples relating to creating redundant vias, the manufacturing criteria may determine a minimum distance between a redundant via and a connection line. Based upon this minimum distance, the design data processing module 405 will determine whether an area can support a redundant via without being positioned too close to a connection line. With still other embodiments of the invention, however, the manufacturing criteria may include parameters for moving or narrowing a connection line.

Accordingly, the design data processing module 405 may employ these parameters to additionally determine whether an area can be made to support a redundant via by moving or narrowing a connection line. Modified design data created using such manufacturing criteria may thus include both data for creating a redundant via and data for moving or narrowing a connection line. The feedback provided for the modified design data may then separately identify redundant vias that can be created without modifying a designed connection line and redundant vias that can be created by moving or narrowing a connection line.

Rule-Based and Model-Based Use of Manufacturing Criteria

Various embodiments of the invention may employ manufacturing criteria on a rule basis, on a model basis, or a combination of the two. With a rule-based embodiment, the design for manufacture tool 601 will follow specific rules to create modified design data. For example, the above-described method relating to the creation of redundant vias may be implemented a rule-based application of manufacturing criteria. More particularly, the design data process module 405 may follow a series of rules specifying, e.g., that it check every single-transition via (or every selected single-transition via) to determine if the via will support a redundant via, provide one type of output if the via will support a redundant via complying with the manufacturing criteria, and provide another type of output if the via will not support a redundant via complying with the manufacturing criteria.

With a model-based application of manufacturing criteria, the design for manufacture tool 601 will employ a model, such as a process fabrication model, to determine how the design data will be modified. For example, a particle-size versus yield model may be employed to create modified design data that accounts for a number of different variables.

Figure 7:
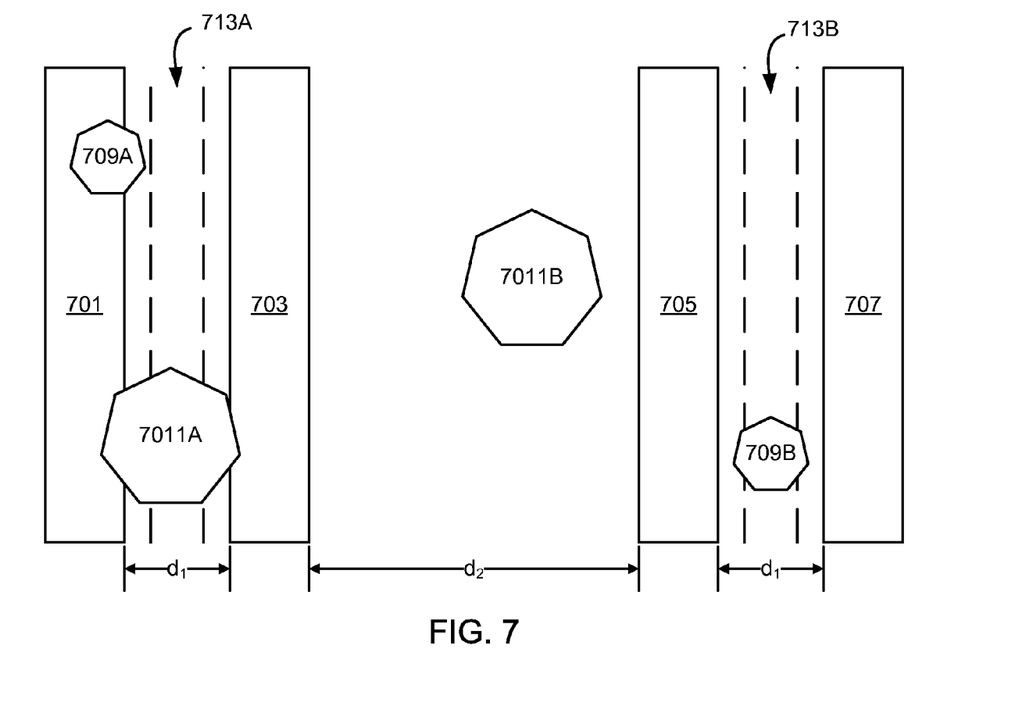
FIG. 7 illustrates four parallel connection lines.

Referring now to FIG. 7, this figure illustrates four parallel connection lines 701-707. The connection line 701 is spaced at a distance $d_1$ from the connection line 703. Similarly, the connection line 705 is spaced at a distance $d_1$ from the connection line 707. Connection lines 703 and 705 are then separated by a distance $d_2$ that is greater than the distance $d_1$. As will be appreciated by those of ordinary skill in the art, particles in the atmosphere during the manufacturing process can damage or even destroy the functionality of adjacent connection lines. For example, a particle contacting two adjacent connection lines may short the lines, causing them to work improperly. For this reason, manufacturers strictly control the number and size of particles in their microcircuit fabrication rooms.

The likelihood of this type of shorting fault occurring in a pair of adjacent connection lines depends upon the number of particles, the size of the particles, and the distance between the adjacent connection lines. As shown in FIG. 7, particles 709 have a smaller width than the distance $d_1$, and thus cannot create a short between any of the connection lines 701-707. Larger particles 711, however, are wider than distance $d_1$. Accordingly, if a particle 711 falls within an area 713 between connection lines 701 and 703 or between 705 and 707, then the particle 711 will short the adjacent connection lines. On the other hand, because the width of a particle 711 is smaller than distance $d_2$, a particle 711 will not create a short between connection lines 703 and 705.

In the illustrated example, the frequency of shorting faults may be reduced by reducing the number of particles wider than distance $d_1$, increasing the value of distance $d_1$, or both. Increasing the value of distance $d_1$ by moving connection lines 703 and 705 closer together, however, will make these connection lines more susceptible to shorting (i.e., would increase the number of particles larger than distance $d_2$). As will be appreciated by those of ordinary skill in the art, both reducing the number of particles wider than distance $d_1$ and widening the value of the distance $d_1$ between connections lines would provide yield benefits but would also incur manufacturing and/or performance costs.

Accordingly, various embodiments of the invention may employ models relating yield benefits, manufacturing costs, performance costs or a combination of the three to particle size and distribution values, connection line width and distribution values, or both. For example, the invention may employ a model that identifies how the yield of a circuit design is affected by different particle size and distribution values. The particle size and distribution values may be graphically represented by, e.g., a bell-type curve showing the number of particles per cubic foot of space that are smaller than one micron, the number of particles per cubic foot of space that are between one and five microns in size, the number of particles per cubic foot of space that are between five and ten microns in size, etc. This model may further identify how the manufacturing yield of the design changes if the connection width and distribution values are changed (e.g., if the distance between more connection lines are widened).

Using this type of modeling, various embodiments of the invention may create modified design data that, for example, widens the distance between various connection lines. Further, various embodiments of the invention may provide feedback to a designer that allows the designer to compare the yield benefits and/or incurred costs of widening the distance between various connection lines with the yield benefits and/or incurred costs of reducing the distribution of particles above a selected size during manufacturing.

Types of Design Data that May be Improved

While the addition of redundant vias has been used as a specific example above, various embodiments of the invention may be used to modify any type of design data for improved manufacturability. For example, in addition to adding redundant vias, various examples of the invention may be used to widen connection lines, add metal fill to planarize the surface of a microdevice, reduce the density of connections in a region of a microcircuit, or any other improvement to a component of a microdevice.

Moreover, various examples of the invention may be employed to improve geometric design data used to construct the geometric features of a microdevice. For example, different implementations of the invention may be employed to improve the shape of masks used in a photolithographic processes to create a microdevice. Thus, mask design data may be modified to extend the end caps of polygonal structures of the microdevice when room is available, to ensure that the resulting polygon structures are manufactured with sufficient surface area. Further, the arrangement of the polygonal structures can be modified to reduce the number of steps in the photolithographic process (or "shot count").

In addition, process variations encountered with chemical-mechanical polishing (CMP) can also be evaluated and corrected by various implementations of the invention. These corrections can take the form of adding polygons to empty regions, so that additional metal fills the spaces represented by the polygons, correcting the distortions in the polishing process.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of designing a microdevice, comprising:
using a computer to analyze a design for a microdevice to identify design data associated with manufacturing criteria;
selecting at least a portion of the identified design data to be displayed;
displaying the selected portion of the identified design data on a display;
receiving a selection of at least a portion of the displayed design data to modify; and
modifying the selected portion of the displayed design data based upon the manufacturing criteria.

2. The method recited in claim 1, further comprising selecting the portion of the identified design data to be displayed based upon statistical information.

3. The method recited in claim 2, wherein the statistical information relates to a frequency of occurrence of the portion of the identified design data.

4. The method recited in claim 3, wherein the frequency of occurrence is the frequency of occurrence of the portion of the identified design data in the design.

5. The method recited in claim 3, wherein the frequency of occurrence is the frequency of occurrence of the portion of the identified design data in a specified structure.

6. The method recited in claim 2, wherein the statistical information relates to the frequency of failure of the portion of the identified design data.

7. The method recited in claim 1, further comprising selecting the portion of the identified design data to be displayed based upon a hierarchy of the design to the microdevice.

8. The method recited in claim 7, wherein
the design is hierarchically organized into cells; and
the portion of the identified design data selected to be displayed corresponds to a cell.

9. The method recited in claim 1, further comprising selecting the portion of the identified design data to be displayed based upon a structure represented by the portion of the identified design data.

10. The method recited in claim 9, wherein the structure is selected by a user of the design.

11. The method recited in claim 10, wherein the structure is selected based upon a frequency of occurrence of the structure in the design.

12. The method recited in claim 1, further comprising selecting the portion of the identified design data to be displayed based upon a position on the microdevice of a structure represented by the portion of the identified design data.

13. The method recited in claim 1, further comprising:
receiving cost/benefit analysis information corresponding to the manufacturing criteria; and
selecting the portion of the identified design data to be displayed based upon the received cost/benefit analysis information.

14. The method recited in claim 13, further comprising displaying at least a portion of the received cost/benefit analysis information.

15. The method recited in claim 1, further comprising:
receiving performance analysis information corresponding to the manufacturing criteria; and
selecting the portion of the identified design data to be displayed based upon the received performance analysis information.

16. The method recited in claim 15, further comprising displaying at least a portion of the received performance analysis information.

17. The method recited in 15, wherein the performance analysis information relates to a yield improvement obtained from modifying the portion of the identified design data to be displayed based upon the manufacturing criteria.

18. The method recited in 15, wherein the performance analysis information relates to a timing improvement in the microdevice obtained from modifying the portion of the identified design data to be displayed based upon the manufacturing criteria.

19. The method recited in 15, wherein the performance analysis information relates to a size improvement obtained from modifying the portion of the identified design data to be displayed based upon the manufacturing criteria.

20. The method recited in claim 1, wherein the selected portion of the displayed design data to be modified is selected by a user of the design.

* * * * *